United States Patent [19]

Azema

[11] Patent Number: 5,773,775
[45] Date of Patent: Jun. 30, 1998

[54] PRESSURE ACTUATED CIRCUIT BREAKER WITH FRANGIBLE PRINTED CIRCUIT BOARD

[75] Inventor: Tadamitsu Azema, Miyagi-ken, Japan

[73] Assignee: Alps Electric Co., Ltd., Tokyo, Japan

[21] Appl. No.: 646,655

[22] Filed: May 8, 1996

[30] Foreign Application Priority Data

| May 31, 1995 | [JP] | Japan | 7-158632 |
| May 17, 1995 | [JP] | Japan | 7-118658 |
| Jun. 7, 1995 | [JP] | Japan | 7-140774 |
| Jul. 31, 1995 | [JP] | Japan | 7-194887 |

[51] Int. Cl.[6] ............... H01H 85/00; H01M 2/34; H02H 7/18
[52] U.S. Cl. .................. 200/61.08; 429/178
[58] Field of Search ............... 200/61.08, 81 R, 200/83 R; 429/57, 59, 53, 178–181

[56] References Cited

U.S. PATENT DOCUMENTS

| 3,072,500 | 1/1963 | Berlinghof | 200/61.08 X |
| 3,745,276 | 7/1973 | McPherson | 200/61.08 |
| 3,748,413 | 7/1973 | Sawyer | 200/61.08 |
| 3,822,369 | 7/1974 | Kunczynski | 200/61.08 |
| 3,859,482 | 1/1975 | Matsui et al. | 200/61.08 |
| 4,178,855 | 12/1979 | McVay et al. | 200/61.08 X |
| 5,418,082 | 5/1995 | Taki et al. | 429/53 |
| 5,585,207 | 12/1996 | Wakabe et al. | 429/178 |

*Primary Examiner*—J. R. Scott
*Attorney, Agent, or Firm*—Guy W. Shoup

[57] ABSTRACT

A pressure actuated breaker for cutting-off current flow in and from a battery in response to a relatively low internal pressure rise within the battery. The pressure cut-off sensor includes a box having an opening and being formed of an insulating material, a bendable packing for covering the opening and which is deformed into the box by external pressure, an actuator having a higher elasticity than the packing and being pressed by the deformation of the packing, and a breakable element supported in the box, the breakable member including a substrate and a conductive path formed on the substrate. When pressure within the battery exceeds a predetermined amount, the packing is pressed inward into the box, thereby pressing the actuator against the breakable member such that the substrate is cracked, thereby breaking the conductive path.

11 Claims, 13 Drawing Sheets

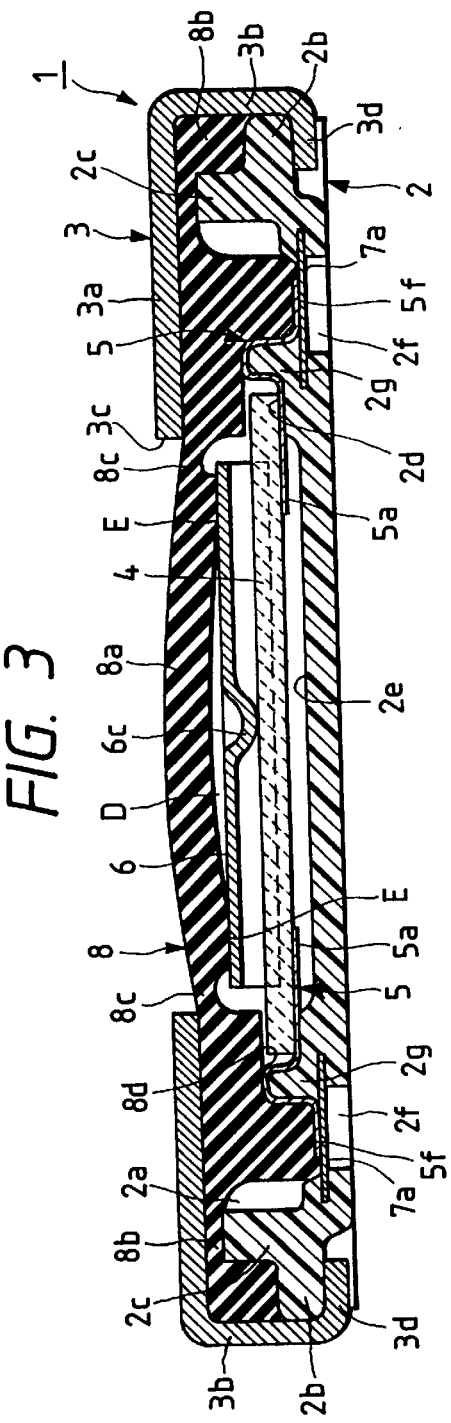

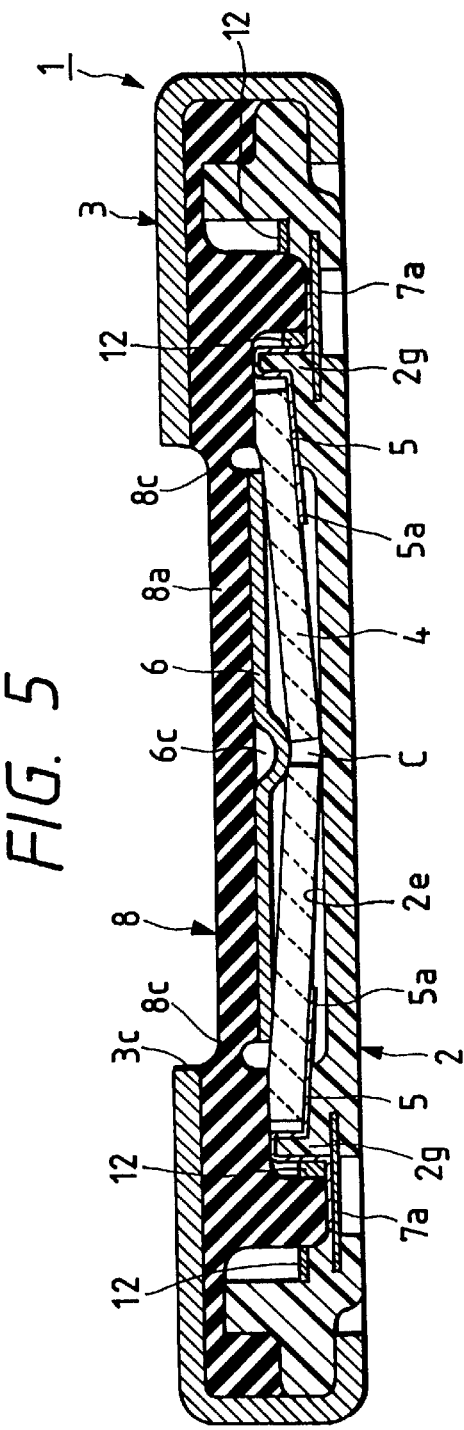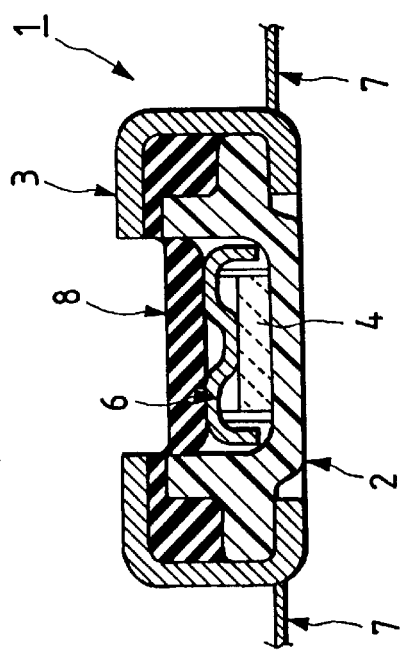

PRINT OF ELECTRICALLY CONDUCTING PATH

PRINT OF ELECTRODE PATTERN

PRINT OF COATING MATERIAL

DIVISION

PRESSURE ACTUATED CIRCUIT BREAKER WITH FRANGIBLE PRINTED CIRCUIT BOARD

BACKGROUND OF THE INVENTION

1. Field of the Invention

The invention relates to a pressure actuated breaker used to secure a safety of batteries which can be reproduced by re-charge such as a secondary battery.

2. Description of the Related Art

Even if the battery of this kind has been charged, when the battery is further charged or the battery is charged with a higher current than a regulated current, there sometimes occurs a phenomenon that abnormality occurs in the battery to generate gas within the battery, and as a result, pressure and temperature within the battery increase to adversely affect on appliances in which the battery is incorporated due to the exudation of electrolyte caused by the expansion or cracking of the battery. When the battery is continuously used under the condition as described, the expansion of the battery progresses, possibly resulting in occurrence of cracking or rupture. It is necessary to immediately stop using the abnormal battery as described.

In view of the foregoing, the safety measures for the batteries of this kind have been heretofore taken, which include a battery of a type in which a safety valve is provided which is opened due to the increase in pressure within the battery to discharge gas from the battery, and a battery of a type in which means are provided internally and externally of the battery which detects a rise in temperature to cause a current not to flow into an electric circuit to which the battery is connected.

However, in the former type in which the safety valve is provided, since the safety valve is provided in the battery, consideration should be taken to piping installed within the battery, which comprises a limitation in designing the battery into a small type. On the other hand, in the latter type in which the rise in temperature within the battery is detected, when the temperature lowers as the time passes, there is a possibility that a current flows into the electric circuit again so that the battery is reused.

The present applicant has proposed, in Japanese Patent Laid-Open No. Hei 6-179619 (1994), a pressure protection device of a type incorporated within a battery. In this type, when pressure within the battery once rises, an electric path of the pressure protection device is cut-off to discontinue supplying a power to the inside and outside of the battery. FIG. 23 shows the basic construction of the type as described, and FIG. 24 schematically shows the device incorporated in the battery. This pressure protection device 101 comprises a circuit substrate 104 in which a conductive path 102 is provided on a ceramic substrate 103, a box 105 for receiving the circuit substrate 104 air-tightly, a holding member 106, a lid 107, a projection 107a formed on the lid 107 and opposed to the ceramic substrate 103, leads 102a and 102b provided at the ends of the conductive path 102, and a pair of wiring members 108a and 108b connected to the leads 102a and 102b respectively by a method such as pressing and exposed to outside. The wiring members 108a and 108b are placed in electrical conduction through the conductive path 102. The box 105 is formed of thick aluminum and is hard to deformed. The lid 107 has a thin wall-thickness so as to be easily flexed.

The pressure protection device 101 is incorporated into a battery 109 such as a lithium ion secondary battery and a nickel hydrogen secondary battery. FIG. 24 schematically shows the battery 109 in the form of the lithium ion secondary battery. Reference numeral 110 designates a closed-end hollow cylindrical member whose upper end is open, which serves as an external negative pole. Reference numeral 113a designates an external positive pole having conductivity, which is generally formed of stainless steel. Reference numeral 113b designates a positive pole lid which serves as a positive pole within the battery and is formed of aluminum, the positive pole lid 113b being placed in conduction with the external positive pole 113a. A gasket 112 is provided over the whole periphery between the cylindrical member 110 and the positive pole lid 113b. A caulking portion 110b provided at the top of the cylindrical member 110 is caulked over the whole periphery thereby holding the positive pole lid 113b on the cylindrical member 110, securing the insulation between the cylindrical member 110 and the positive pole lid 113b, securing the sealing properties in the battery, and shielding between the external positive pole 113a formed of stainless steel and an electrolyte 117 described later.

Inside of the cylindrical member 110 are incorporated a positive pole 114 formed of lithium oxide cobalt as an internal electrode, a negative pole 115 formed of carbon, a separator 116 for preventing a short-circuiting between the positive pole and the negative pole, and the pressure protection device 101. The pressure protection device 101 is connected to the positive pole lid 113b by the wiring member 108a and connected to the positive pole 114 by the wiring member 108b. The negative pole 115 is provided so as to oppose to the positive pole 114 with the separator 116 sandwiched therebetween, and connected to the cylindrical member 110. The cylindrical member 110 is interiorly filled with the electrolyte 117.

When the thus constructed battery 109 is charged or discharged with a higher current than a normal operating current, the electrolyte 117 in the battery 109 is decomposed to generate gas in the battery 109, and the pressure in the battery rises. Then, the lid 107 becomes flexed and the projection 107a comes in pressure contact with the ceramic substrate 103 to rupture the ceramic substrate 103 and at the same time cut-off current between the ends of the conductive path 102. As a result, the electric conduction between the pair of wiring members 108a and 108b is disengaged to stop the charge or discharge with respect to the inside and outside the battery.

The conductive path 102 is formed by printing and calcinating a silver-contained paste or formed on a ceramic substrate by a method for plating a metal material.

However, the pressure protection device as described is required to have properties contrary to each other such that means for breaking the conductive path is required to have elasticity which is deformed in quick response to a variation in pressure as well as rigidity enough to break the conductive path in response to the pressure variation. Further, it is desirable for the aforesaid means to be able to break the conductive path with a relatively low pressure, say a change in pressure of the battery. However, normally, the pressure in the battery somewhat varies. When the conductive path is set so as to be broken with a weak force, it may possibly be broken even with the variation in pressure at the normal time.

Further, it is desired that the using mode (mounting position) of the pressure protection device is free. To fulfill this, it is considered that the pressure protection device be formed into a unit.

And it is desired that terminals are drawn out of the substrate and the substrate is broken with the weak force due to the rise in internal pressure of the battery. However, when the terminals are fixed on both ends of the substrate, the substrate assumes the twin support state and the strength with respect to the breakage of the substrate increases. If such a configuration as described is employed, the substrate is not broken unless pressure, for example, approximately 3 kg, is applied to the substrate. Therefore, the sensitivity of the device is so poor as not to be practical, making it difficult to form the device into a unit.

The prior art has a further problem in that even if the ceramic substrate is broken due to the application of a load to the ceramic substrate, a part of the conductive path remains connected due to the elongation of the silver content or metal material and the conductive path fails to cut-off.

Further, since the connection between the conductive path and the terminals is effected by pressing, there poses a problem in that the contact is unreliable. It is contemplated that the connection portion is soldered to secure the reliability of the contact. In this case, however, this involves a problem in that it is difficult to manage the amount of solder or the assembly operation is cumbersome.

SUMMARY OF THE INVENTION

The present invention has been achieved in view of the foregoing involved in the prior art. It is a first object of the present invention to provide a pressure actuated breaker which can quickly respond to a variation in pressure within a battery, which can concentrate even a relatively low pressure at one point to efficiently break a breaking member so as to automatically cut-off a current flowing into an electric circuit, and which can provide a miniaturization and a stabilization of breaking characteristics.

It is a second object of the present invention to provide a pressure actuated breaker which is broken by a relatively low pressure in an abnormal condition but is not broken by a variation in pressure during normal operation.

It is a third object of the present invention to provide a pressure actuated breaker which when broken by a variation in pressure, no conduction due to contact between the broken pieces or the like is made again thereafter.

It is a fourth object of the present invention to provide a pressure actuated breaker which can maintain sealing properties even if internal pressure increases.

It is a fifth object of the present invention to provide a pressure actuated breaker which can maintain sealing properties even after occurrence of deformation by the pressure.

It is a sixth object of the present invention to provide a pressure actuated breaker which is most suitable for a thinner configuration and can be easily produced.

It is a seventh object of the present invention to provide a pressure actuated breaker in which the use of a battery involving an abnormality of a rise in pressure can be positively stopped, a material having excellent connecting properties with respect to a conductive path can be selected as a connecting member, the influence of a breaking member on the breaking characteristics can be minimized, a thin film of a molding material is hard to be formed on a joining surface to enhance the stability of joining, terminals can be drawn out of a substrate within a closed box even if the sensor is in the form of a unit, and the substrate can be broken by a low pressure even if the terminals are connected to the substrate to enhance the sensibility of the sensor.

It is an eighth object of the present invention to provide a pressure actuated breaker which can improve sealing properties, can prevent an adhesive from flowing into a breaking member, can easily manage the amount of the adhesive, and can enhance the connecting strength between terminals and a connecting member.

It is a ninth object of the present invention to provide a pressure actuated breaker in which a conductive path is positively cut-off and the re-use thereof cannot be made.

It is a tenth object of the present invention to provide a pressure actuated breaker in which a reliability of a connection between an electrode of a conductive path and terminals increases, and the connection between the electrode and terminals can be easily performed.

The aforesaid first object is achieved by a first means comprising a box formed of an insulating material having a part opened, a pressure receiving member for closing the opening of the box and being deformed by pressure, an operating member having a higher rigidity than the pressure receiving member and being pressed by deformation of the pressure receiving member, and a breakable number contained in the box, having a conductive path, and when the pressing by the operating member exceeds a predetermined value, breaking the conductive path.

The aforesaid second object is achieved by a second means according to the first means, wherein a clearance is provided between the pressure receiving member and the operating member.

The aforesaid third object is achieved by a third means according to the first means, wherein the pressure receiving member is provided with a pre-pressure portion for applying a predetermined pressure to the operating member in advance.

The aforesaid fourth object is achieved by a fourth means according to the first means, wherein a peripheral edge portion of the pressure receiving member is made thicker than the other portions, and the peripheral edge portion is secured to an outer peripheral portion of the box.

The aforesaid fifth object is achieved by a fifth means according to the first means, wherein the thickness of a portion of the pressure receiving member in contact with the operating member is made thicker as compared with that of the peripheral portion thereof.

The aforesaid sixth object is achieved by a sixth means according to the first means, wherein both the box and the pressure receiving member are formed of a thermoplastic resin, and a joining surface between the box and the pressure receiving member is thermally welded. In this case, preferably, the box and the pressure receiving member are formed of the same kind of thermoplastic resin.

The aforesaid seventh object is achieved by a seventh means comprising a box formed of an insulating material having a part opened, a pressure receiving member for closing the opening of the box and being deformed by an external pressure, a breakable member contained in the box, having a conductive path, and when the pressing by the pressure receiving member exceeds a predetermined value, breaking the conductive path, a pair of connecting members having conductivity connected to the conductive path, and a pair of terminals joined to the connecting members within the box and being insert-molded relative to the box, the box being provided with a depression extending to the back of the terminals of the joining portion between the connecting members and the terminals.

The aforesaid eighth object is achieved by a eighth means according to the seventh means, wherein a partitioning wall is provided between the joining portion and the breakable member, and an adhesive is filled on the side of the joining portion partitioned by the partitioning wall.

The aforesaid ninth object is achieved by a ninth means comprising a box formed of an insulating material having a part opened, a pressure receiving member for closing the opening of the box and being deformed by pressure, a breakable member contained in the box, including a conductive path, a substrate provided with the conductive path on the surface and having a smaller elongation than the conductive path, and a coating member formed integrally on the conductive path and having a smaller elongation than the conductive path, when the pressing by the pressure receiving member exceeds a predetermined value, the conductive path being broken, and a pair of connecting terminals in conduction with the conductive path and being extended outside.

The aforesaid tenth object is achieved by a tenth means according to the ninth means, further comprising electrodes provided at the ends of the conductive path, wherein the coating member is provided so as to have openings on the electrodes, and the connecting terminals are placed in the openings and connected to the electrodes by soldering.

According to the first means, when the pressure receiving member is deformed by receiving the pressure, the operating member is pressed, and the breakable member breaks the conductive path by means of the operating member. Since the pressure receiving member is separated from the operating member, their elasticity and rigidity can be independently set. Accordingly, since the pressure receiving member can efficiently receive the pressure, soft materials and shapes can be selected, hard materials and shapes can be selected for the operating member, and the pressure can be concentrated at one point to efficiently break the breakable member. Thereby, the miniaturization and the stability of the breaking characteristics can be secured.

In the second means, even in the normal using condition of charge and discharge, for example, in a secondary battery, it is pressed about one atmospheric pressure. However, due to the presence of a clearance between the pressure receiving member and the operating member, a pressing force to some extent can be absorbed by the deformation of the pressure receiving member within the clearance, and the breakable member is not pressed every time to apply stress. Accordingly, even if about one atmospheric pressure is applied in the normal using state of charge and discharge, the stability of the breaking pressure can be maintained for a long period of time.

In the third means, since the pre-pressure is always applied to the operating member by the pressure receiving member, the broken part of the breakable member does not again come in contact for conduction due to a reaction or the like after the breakable member has been broken.

In the fourth means, even if the pressure increases, the pressure receiving member is pulled inward as the pressure increases to enhance the sealing properties between the pressure receiving member and the box.

In the fifth means, the portion of the pressure receiving member for pushing the operating member tends to be compressed to become thinner. In the case where the pressure receiving member is formed of a soft material in order to reduce the elasticity, the permeability of gas increases to lower the sealing properties. However, the portion of the pressure receiving member in contact with the operating member is thicker in thickness than the peripheral portion thereof, and the portion is not much deformed even if said portion is displaced from its original position. Then, the thickness of the portion which is mainly deformed remains unchanged, thus enabling the enhancement of the sealing properties without increasing the elasticity.

In the sixth means, since both the box and the pressure receiving member are formed of a thermoplastic resin, the joining surface between the box and the pressure receiving member is thermally welded using a supersonic welding or the like whereby both the elements can be integrated simply and positively. In particular, in the case where the same kind of thermoplastic resin is used for the box and the pressure receiving member, its contactness is excellent.

In the seventh means, the use of the battery involving the abnormality in which the atmospheric pressure rises can be positively stopped. Further, a material having a good connecting property with the conductive path can be selected for the connecting member. Further since the elasticity of the connecting member can be set to be smaller than that of the terminal, the influence of the breakable member on the breaking characteristic can be minimized. Furthermore, since the insert molding to the box while holding the joining portion of the terminal from both sides thereof can be accomplished, a thin film of the molding material is prevented from being formed on the joining surface to improve the stability of the joining.

In the eighth means, the sealing properties are improved to prevent the adhesive from flowing on the side of the breakable member to facilitate the management of the amount of the adhesive, enhancing the connecting strength between the terminal and the connecting member.

In the ninth means, since the conductive path having a metal component and having a large elongation is sandwiched for integral formation between the substrate having a smaller elongation than that of the conductive path and the hard coating material, the elongation of the conductive path can be suppressed to cause breakage of the conductive path. Accordingly, when the pressure of the pressure actuated breaker rises, the pressure receiving member presses the substrate to break the substrate and at the same time to positively cut-off the conductive path. Thereby when employed within the battery, the charge of discharge to the inside or outside the battery can be stopped.

In the tenth means, when the opening is provided in the coating member on the electrode and the connecting terminal is soldered, the connection therebetween can be positively obtained to prevent solder form flowing away from the connecting terminal, facilitate the management of the solder amount and suppress the projecting amount of the soldered portion.

BRIEF DESCRIPTION OF THE DRAWINGS

FIG. 3 is a sectional view taken on line 3—3 in FIG. 1;

FIG. 4 is a sectional view taken on line 4—4 in FIG. 1;

FIG. 5 is a sectional view in the state where a conductive path is broken, corresponding to FIG. 3;

FIG. 6 is a sectional view in the state where the conductive path is broken, corresponding to FIG. 4;

DESCRIPTION OF THE PREFERRED EMBODIMENTS

The preferred embodiments of the present invention will be described hereinafter with reference to the drawings.

Figure 1:
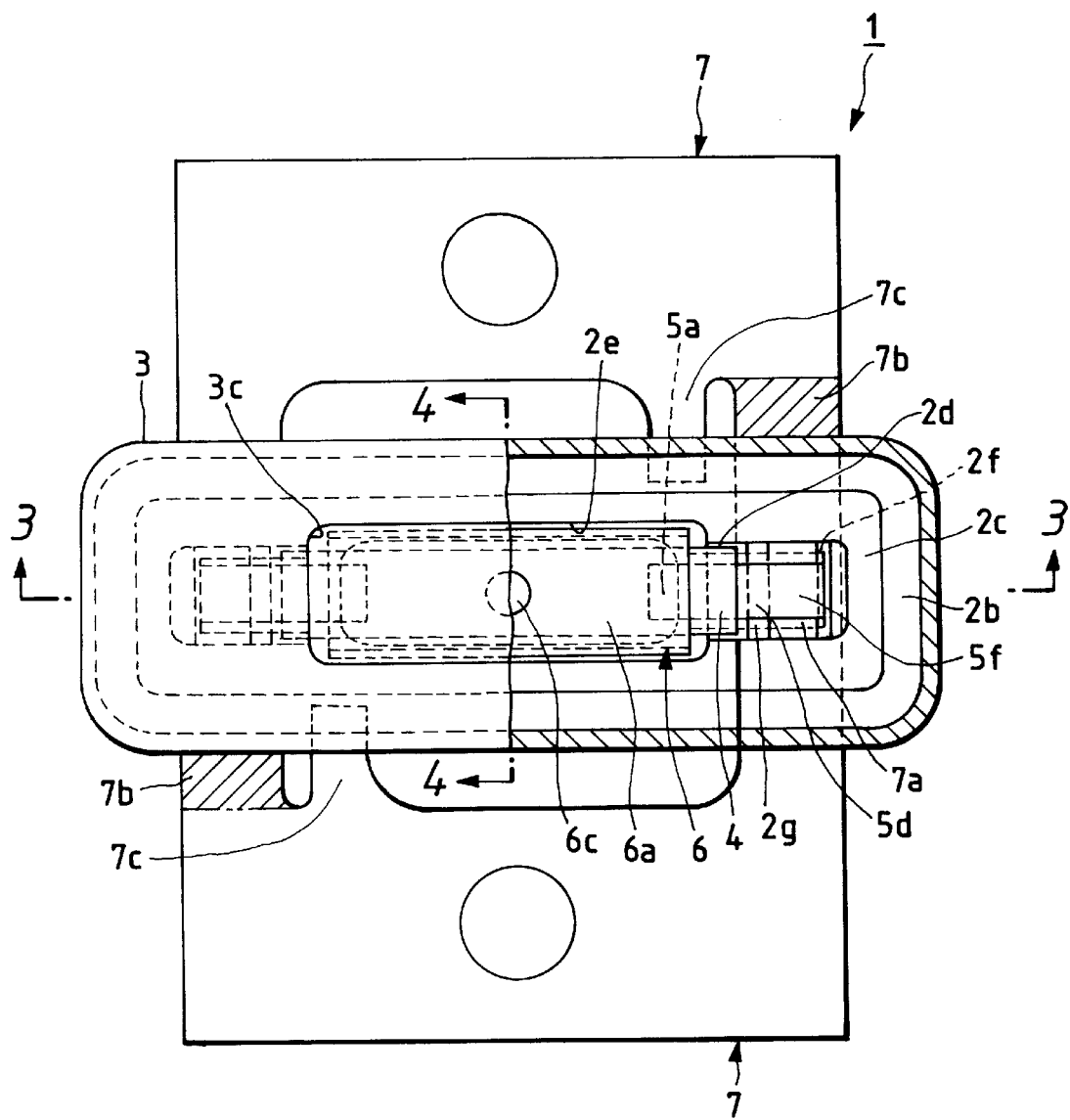
FIG. 1 is a partly cutaway plan view of a pressure actuated breaker according to a first embodiment of the present invention.
Figure 2:
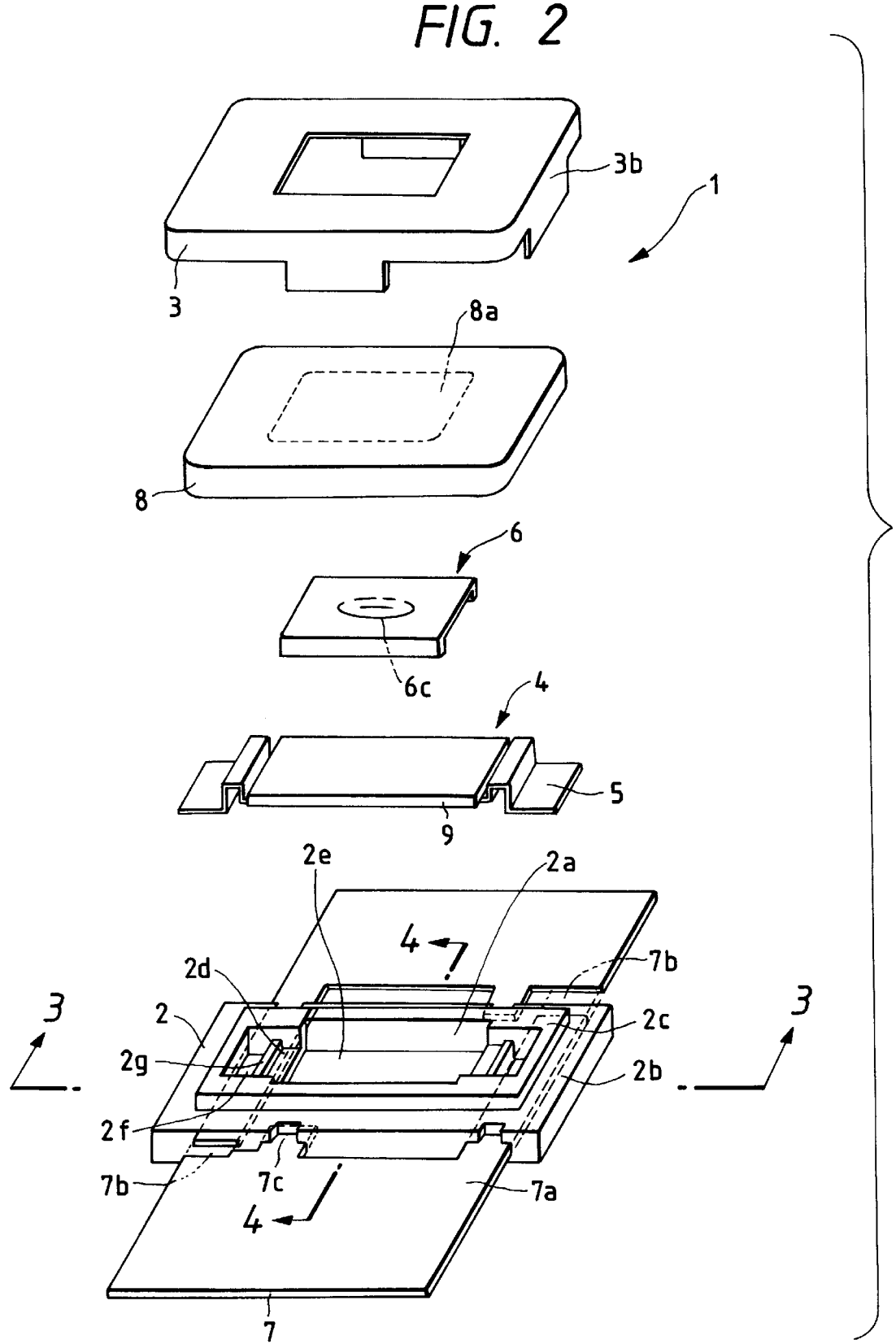
FIG. 2 is a perspective view of FIG. 1.
Figure 7:
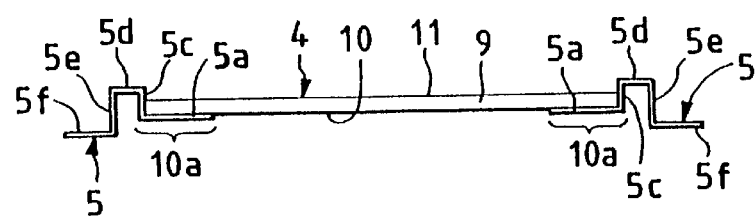
FIG. 7 is an explanatory view showing a substrate and a lead provided on the pressure actuated breaker in FIG. 1.
Figure 8:
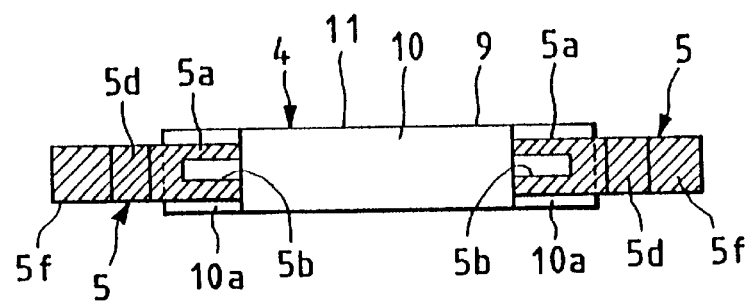
FIG. 8 is a plan view showing the state before the lead in FIG. 7 is folded.
Figure 9A:
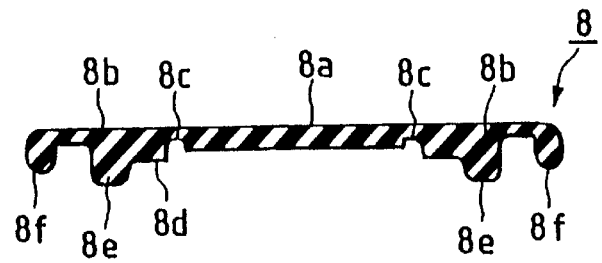
FIGS. 9A and 9B show a lower case provided for the pressure actuated breaker in FIG. 1, FIG. 9A being a plan view and FIG. 9B being a longitudinal sectional view.
Figure 9B:
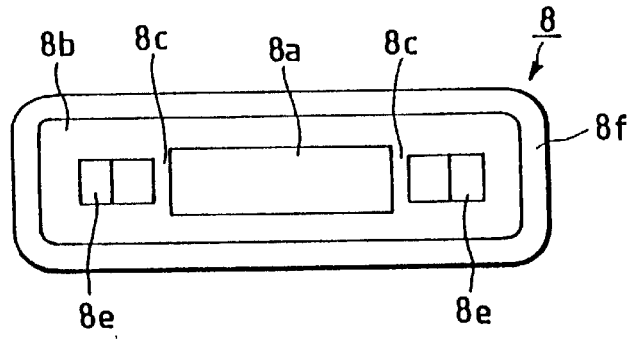
Figure 10:
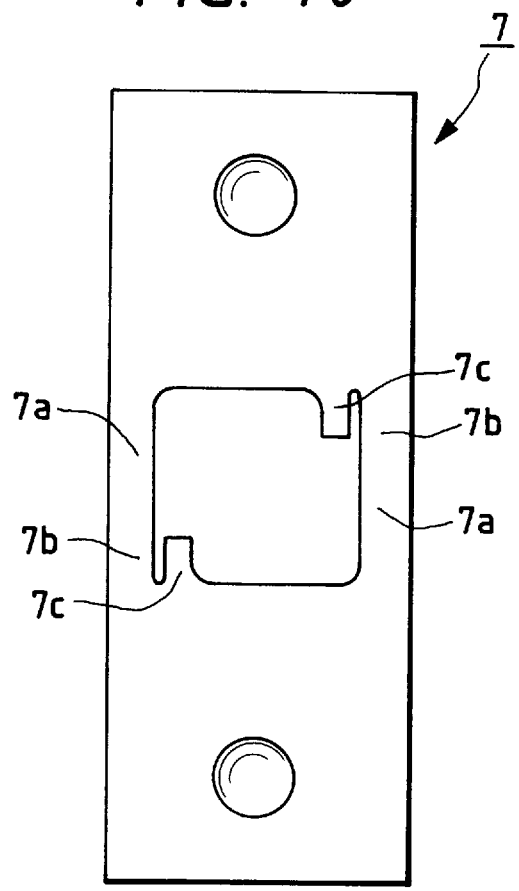
FIG. 10 is a plan view of a terminal before insert molding provided on the pressure actuated breaker in FIG. 1.
Figure 11A:
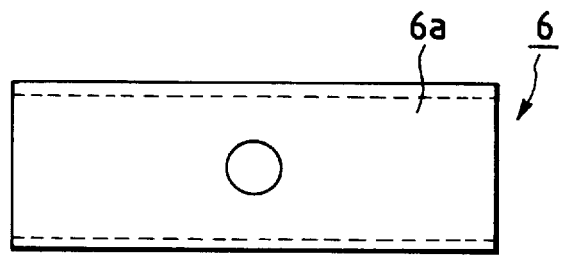
FIGS. 11A and 11B show an actuator provided on the pressure actuated breaker in FIG. 1, FIG. 11A being a front view, and FIG. 11B being a right side view.
Figure 11B:
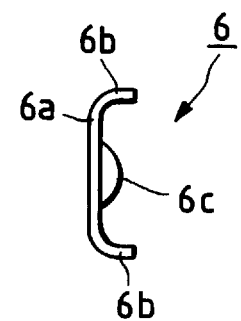
Figure 12:
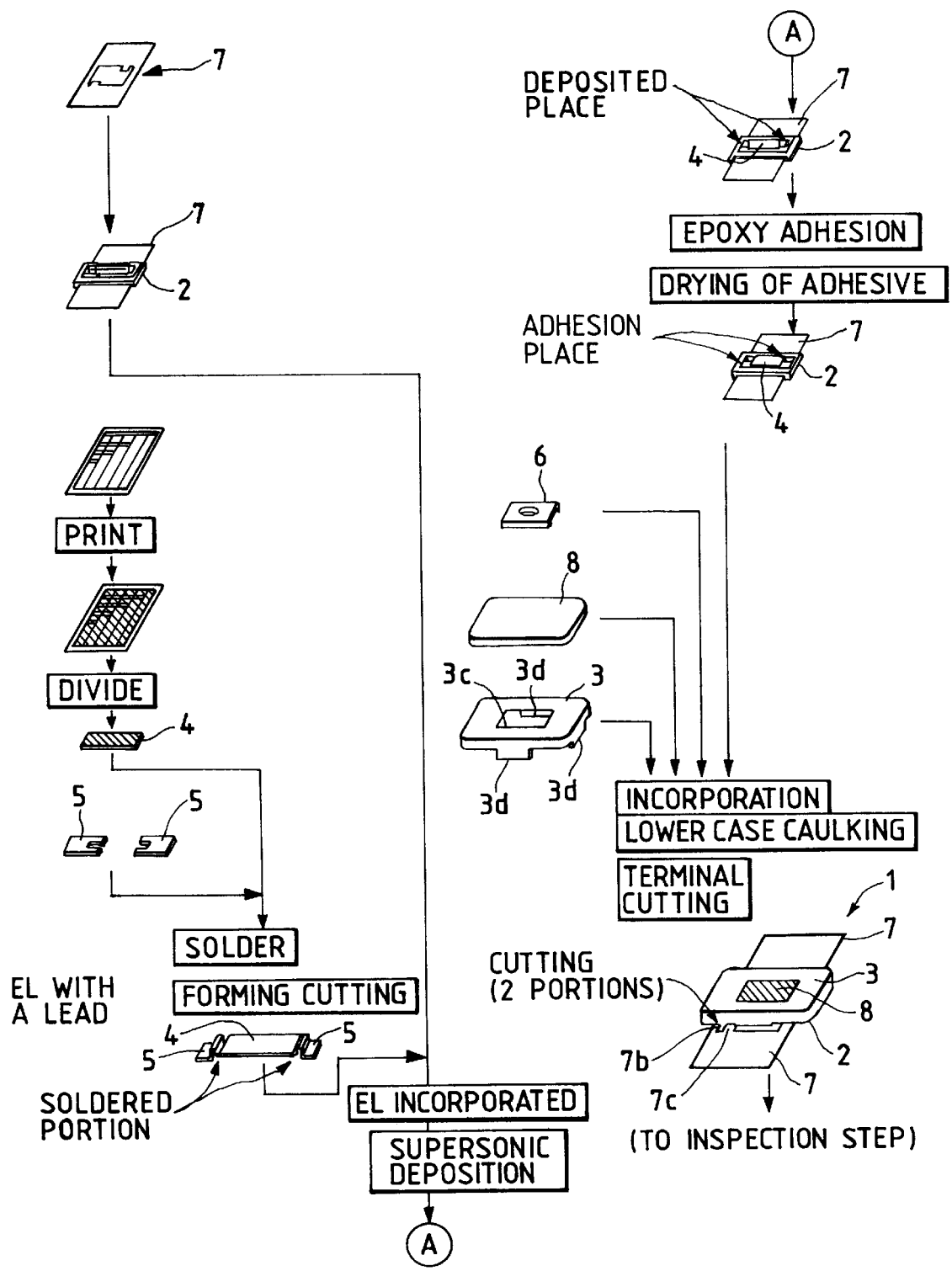
FIG. 12 is an explanatory view showing the steps of assembling the pressure actuated breaker in FIG. 1.

FIG. 1 is a partly cutaway plan view of a pressure actuated breaker according to a first embodiment of the present invention. FIG. 2 is a perspective view of FIG. 1. FIG. 3 is a sectional view taken on line 3—3 of FIG. 1. FIG. 4 is a sectional view taken on line 4—4 of FIG. 1. FIG. 5 is a sectional view in the state where a conductive path is broken, corresponding to FIG. 3. FIG. 6 is a sectional view in the state where the conductive path is broken, corresponding to FIG. 4. FIG. 7 is an explanatory view showing a substrate and a lead provided on the pressure actuated breaker in FIG. 1. FIG. 8 is a plan view showing the state before the lead in FIG. 7 is folded. FIGS. 9A and 9B show a lower case provided for the pressure actuated breakers FIG. 9A being a plan view and FIG. 9B being a longitudinal sectional view. FIG. 10 is a plan view of a terminal before insert molding provided on the pressure actuated breaker in FIG. 1. FIGS. 11A and 11B show an actuator provided on the pressure actuated breaker, FIG. 11A being a front view and FIG. 11B being a right side view. FIG. 12 is an explanatory view showing the steps of assembling the pressure actuated breaker in FIG. 1.

Referring to these figures, reference numeral 1 designates a pressure actuated breaker. The pressure actuated breaker 1 principally comprises a box comprising a lower case 2 and an upper case 3, an element 4 (a breakable member), leads 5, an actuator 6, terminals 7, and a packing (a pressure receiving member) 8.

The lower case 2, which is formed of an epoxy resin, comprises a depression 2a having an upper surface opened, a lateral convex portion 2b projected sideways from the outer side, an upper convex portion 2c formed above the side, a rectangular element holding portion 2d formed in the center of the depression 2a, a depressed shoulder portion 2e formed in the center of the inner bottom surface of the element holding portion 2d, holes 2f, 2f provided in the vicinity of both ends of the element holding portion 2d, and a partitioning wall 2g for fitting the leads 5 to hold them, as shown in FIGS. 3 and 4. The holes 2f, 2f are provided with a lead connecting portion 7a of the terminal 7 (described later) by the insert molding to block the holes.

The element 4, which is formed of a material such as ceramic and has an insulating property, comprises an insulating member (substrate) 9 in the form of a rectangular parallelepiped capable of being broken by an external pressure, a conductive portion 10 formed by coating a conductive material such as silver on the lower surface of the insulating member 9, lead portions 10a, 10a formed on both ends of the conductive portion 10, and an insulating coating portion 11 formed by coating an insulating material on the whole surface of the insulating member 9 leaving the lead portions 10a, as shown in FIGS. 7 and 8. This element 4 is formed to have a thickness of 0.3 mm, for example.

In this element 4, normally, the lead portions 10a, 10a are placed in a conductive state through the conductive portion 10. However, when the insulating member 9 of the element 4 is broken by the external pressure, the conductive portion 10 formed on the lower surface of the insulating member 9 is broken to cut-off the conduction between the lead portions 10a, 10a.

The element 4 is formed to be longer than the long side of the depressed shoulder portion 2e of the lower case 2 and to be shorter than the short side of the depressed shoulder portion 2e, as shown in FIGS. 3 and 4, and the element 4 is crosslinked lengthwise over the depressed shoulder portion 2e. The element 4 has its short side located on the depressed shoulder portion 2e of the lower case 2 and gaps provided at both ends thereof so that the element 4 can be moved into the depressed shoulder portion 2e. The depth of the depressed shoulder portion 2e is set to the size so that the element 4 can be broken therein.

The leads 5, 5 are mounted on the lead portions 10a, 10a of the element 4 as shown in FIGS. 7 and 8. The lead 5 is a lengthy plate, which is formed of a copper material having a thickness of 0.03 mm, for example. Accordingly, since the lead 5 has a sufficient flexibility, and even when the element 4 assumes the twin support state by both the leads 5, 5, both the leads 5, 5 become flexed to comprise no obstacle for the breakage of the element 4.

A cut portion 5b is formed in the center of one end 5a of the lead 5, and the one end 5a of the lead 5 including the cut portion 5b is disposed on the lead portion 10a of the element 4 and connected to the cut portion 5b by soldering to effect forming cutting. Thereby, solder is confined within the cut portion 5b and no swell of the solder occurs. The element 4 can be placed on the element holding portion 2d of the lower case 2 in a stable manner. Further, the lead 5 comprises a riser portion 5c formed to be bent upward along the side end of the element 4 from the one end 5a of the lead 5 and beyond the upper surface of the element 4, an upper surface portion 5d and an opposed portion 5e bent into a square shape from the riser portion 5c and again laid below the lower surface of the element 4, and a terminal connecting portion 5f formed to be bent outward from the opposed portion 5e.

The element 4 with the leads 5, 5 is placed on the depression 2a of the lower case 2 with the lead portions 10a, 10a positioned below, the riser portion 5c, the upper surface portion 5d and the opposed portion 5e of the lead 5 are fitted in the partitioning wall 2g of the lower case 2, and the terminal connecting portion 5f of the lead 5 is placed on the lead connecting portion 7a of the terminal 7 of the lower case 2. This terminal connecting portion 5f is connected to the lead connecting portion 7a by supersonic welding, after which it is further coated with an adhesive 12. The adhesive 12 is forced out of the joining surface, as shown in FIG. 5 but is prevented from being moved into the interior due to the presence of the partitioning wall 2g (that is, the riser portion 5c, the upper surface portion 5d and the opposed portion 5e of the lead 5). Therefore, the end of the element 4 is not fixed to the depression 2a of the lower case 2, and the rigidity of the element 4 is not increased more than as needed to obstruct the breakage of the element 4. The element 4 can be positively broken by the set pressure.

The upper case 3 is formed of a material such as aluminum and comprises an upper surface portion 3a and four side portions 3b, 3b, . . . as shown in FIGS. 1 to 4. An opening 3c is bored in substantially the central portion of the upper surface portion 3a, and a stop portion 3d caulked inwardly and stopped at the lower end of the lower case 2 is provided at the lower end of each of the side portions 3b.

A packing 8 is placed over the lower case 2 so as to receive and hold the element 4 and the leads 5. The packing 8 mainly comprises a flexible portion 8a which is formed of an elastic material such as rubber, has an insulating property, has a circular section, has a central portion projected upward, and is subjected to elastic deformation by pressure, and a peripheral edge portion 8b laid in the peripheral edge of the flexible portion 8a. The boundary line between the flexible portion 8a and the peripheral edge 8b is formed to be thinner in wall thickness and is provided with a thin portion 8c. An element receiving depression 8d which is slightly larger than a portion between the protecting walls 2g, 2g of the lower case 2 is provided in the lower surface of the flexible portion 8a, as shown in FIG. 3, by which the element 4 and the leads 5 are fixed. Further, a clearance D is provided between the upper surface of the element 4 placed on the element receiving depression 8d and the lower end of the flexible portion 8a located above the element receiving depression 8d, and an actuator 6 is interposed therebetween. By the provision of the clearance D, deformation of the flexible portion 8a of the packing 8 caused by the variation in the internal pressure to the extent comprising no problem such as the time of the normal charge and discharge can be absorbed by the clearance D so as not to press down the actuator 6. Thereby, the pressure is not applied always or repeatedly to the element 4 through the actuator 6 as previously mentioned to prevent an inconvenience such that the element 4 is broken by the safe pressure.

Further, the peripheral edge 8b of the packing 8 is provided with a projection 8e for causing the terminal connecting portion 5f of the lead 5 to press against the lead connecting portion 7a of the terminal 7, and a projection 8f projected from the outer peripheral edge. This projection 8f is located externally of the upper convex portion 2c of the lower case 2 and is compressed by and sandwiched between the lateral convex portion 2b and the upper case 3. Accordingly, the peripheral portion 8b of the packing 8 is brought into close contact with the lower case 2 and the upper case 3 by the elasticity of the packing 8 itself whereby the interior surrounded by the lower case 2, the packing 8 and the upper case 3 can be positively closed.

The flexible portion 8a of the packing 8 is in the form of a flat plate as shown in FIG. 9A before the packing 8 is incorporated, which is incorporated into the lower case 2 and the upper case 3 by reducing a portion between the opposed sides so that the center is projected to be substantially circular in section.

The actuator 6, which is formed of a material having a high rigidity, such as phosphorus bronze, comprises a plane portion 6a and side plate portions 6b, 6b formed to be bent into a U-shape in section, and a projection 6c projected in the bending direction of the side plate portions 6b in substantially the center of the plane portion 6a as shown in FIGS. 11A and 11B.

When the actuator 6 is received in the hollow portion of the packing 8, the lower case 2 and the upper case 3, the lower projection in the vicinity of the thin portion 8c of the packing 8 comes into contact with the upper surface of the actuator 6 (E shown in FIGS. 3 and 4), and the projection 6c of the actuator 6 comes in contact with the central portion of the upper surface of the element 4. Thereby, the vertical movement of the element 4 is regulated.

Further, the pressure actuated breaker 1 is provided with the rectangular terminals 7 as an external lead terminal of the leads 5 connected to the element 4. The terminal 7 is formed integral with the lower case 2 by outsert molding, as shown in FIG. 1. These terminals 7 are disposed to be point-symmetrical with respect to the center of the lower case 2. That is, the terminal 7 which is initially square and has an opening in the central portion is subjected to press processing, as shown in FIG. 10, and is provided with lead connecting portions 7a, 7a, connecting portions 7b, 7b continuous to the lead connecting portions 7a, 7a, and terminal flexure preventive portions 7c, 7c embedded in the side of the lower case 2. The connecting portions 7b, 7b are cut after being incorporated, which will be described later.

The terminal 7 is separated into separate terminals 7, 7 by cutting the connecting portions 7b, 7b. These terminals 7, 7 are brought into conduction through the element 4 and the lead 5 as previously mentioned. Accordingly, a current flows from the terminal 7 to the element 4 through the lead 5 and further flows into the other terminal 7 from the other lead 5, and vice versa.

Next, the method for assembling the pressure actuated breaker 1 will be described with reference to FIG. 12.

First, pressing is applied to an aluminum plate to mold the terminal 7 shown in FIG. 10 (terminal pressing step), and epoxy/aluminum outsert molding is applied to the terminal 7 to mold the lower case 2 integrally (lower case outsert molding step).

Subsequently, the conductive portion 10, the lead portion 10a and the insulating coating portion 11 are printed and formed on a single ceramic substrate (ceramic large plate processing/large plate printing step), which is divided to obtain a plurality of elements 4 (element dividing step).

Separately therefrom, the lead 5 formed with the cut portion 5b is processed (lead pressing step), solder is applied to the cut portion 5b of the lead 5 to solder the lead 5 to the lead portions 10a, 10a to the lower surfaces of both ends of the element 4 (soldering step), and forming/cutting is carried out to obtain the element 4 with the leads 5 shown in FIGS. 7 and 8 (forming/cutting step).

Then, the element 4 with the leads 5 is placed on the element holding portions 2d of the lower case 2 (element with lead incorporating step), the joining portion between the terminal connecting portion 7a and the terminal connecting portion 5f is supersonic-welded (supersonic welding step), the joining portion is bonded with the adhesive 12 such as an epoxy resin (adhesive applying step), and the adhesive 12 is dried (adhesive drying step).

Thereafter, the actuator 6 is placed on the element 4 received in the lower case 2, the packing 8 is further placed thereover, the upper case 3 is further placed thereover and incorporated (incorporating step), and each stop portion 3d of the upper case 3 is caulked to the lower end of the lower case 2 to fix the upper case 3 and the lower case 2 (upper case caulking step). Thereafter, the connecting portions 7b, 7b (indicated by the oblique lines in FIG. 1) of the terminal 7 are cut to complete the circuit (terminal cutting step).

The assembling of the pressure actuated breaker 1 is completed in the procedure as described above. After assembly, since the peripheral edge 8b is in close contact between the upper case 3 and the lower case 2 by the elasticity of the packing 8, the interior of the pressure actuated breakers is that the interior surrounded by the lower case 2, the packing 8 and the upper case 3 is closed as previously mentioned. Further, the lower end (E shown in the figures) of the flexible portion 8a of the packing 8 is pressed against the upper surface of the actuator 6 to apply pre-pressure (smaller than the force for breaking the element 4) so that the broken element 4 is not returned again for the energized state.

Figure 24:
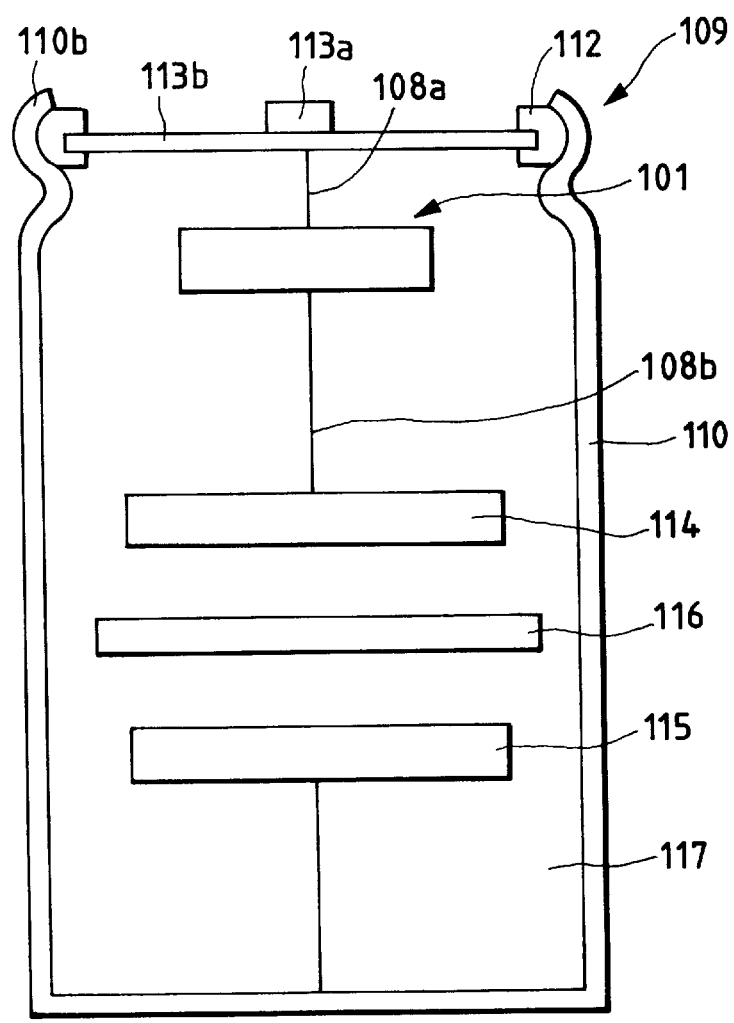
FIG. 24 is a view showing a circuit for a battery on which the conventional pressure protection device is mounted.

The thus assembled pressure actuated breaker 1 is incorporated into the battery 109 (FIG. 24) such as a lithium ion secondary battery and a nickel hydrogen secondary battery.

The operation of the above-described embodiment will be described hereinafter, in which case the lithium ion secondary battery is used.

In the pressure actuated breaker 1, during the charge, a current flows from the positive pole lid 25b to the wiring member 21a, the terminal 7, the lead 5, the element 4, the lead 5, the terminal 7 and the wiring member 21b in said order, and finally to the positive pole 26. That is, the current flows to the lead 5 welded to the terminal 7, passes through the conductive portion 10 from one lead portion 10a at the lower end of the element 4 welded to the lead 5, then to the other lead portion 10a at the lower surface of the element 4, further to the other lead 5 welded to the lead portion 10a, and then to the other terminal 7 from the lead 5.

In this case, when even if the charge is completed, the current is allowed to continuously flow for further overcharge or a larger current than a regulated current flows, an abnormal state occurs in the battery to increase the pressure and temperature within the battery.

When the pressure within the battery rises, it is transmitted to the pressure actuated breaker 1 as an external pressure. Then, as shown in FIGS. 5 and 6, the external pressure causes the flexible portion 8a of the packing 8 to flex inward and deform, and the inner surface of the flexible portion 8a of the packing 8 presses the actuator 6 downward in FIG. 5 and the projection 6c of the actuator 6 presses the substantially central portion of the element 4 downward. Since both ends of the element 4 are placed in the depression 2a of the lower case 2 and fixed to the leads 5 by soldering, the lengthwise and vertical movements thereof are regulated. Accordingly, when the pressure within the battery rises and the pressure reaches a constant level, the element 4 receives the pressure through the projection 6c of the actuator 6 and is further deformed, as shown in FIGS. 5 and 6, after which it is forced into the depressed shoulder portion 2e of the lower case 2 and then broken. The leads 5, 5 are not fixed in their lower surfaces to the element holding portion 2d and have sufficient flexibility, thus not obstructing the breakage of the element 4.

The conductive path 10 constituting the element 4 is broken by the crack C to cut-off the conduction between the lead portions 10a and 10a whereby the pressure actuated breaker 1 cuts off the current flowing between the positive pole lid 25b and the positive pole 26 to stop further charge and place the lithium ion secondary battery in the state where it cannot function as a battery.

As described above, in the above-described embodiment, there are provided the box 2, 3 formed of an insulating material and a part of which is open, the pressure receiving member 8 adapted to close the opening 3c of the box 2, 3 and deformed by pressure, the operating member 6 having a higher rigidity than the pressure receiving member 8 and pressed by deformation of the pressure receiving member 8, and the breakable member 4 contained in the box 2, 3, having the conductive path 10 and breaking the conductive path 10 when pressing by the operating member 6 exceeds a predetermined value. Therefore, the pressure receiving member 8 and the operating member 6 are separated from each other, and their elasticity and rigidity can be independently set. Since the pressure receiving member 8 needs to efficiently receive pressure, a soft material and shape can be selected therefor. For the operating member 6, a hard material and shape can be selected. Accordingly, pressure can be concentrated at one point to efficiently break the breakable member 4. Thereby, the miniaturization and the stabilization of breaking characteristics can be attained.

In the above-described embodiment, the clearance D for allowing the deformation of the pressure receiving member 8 is provided in the transmission channel for pressing the operating member 6 by the pressure receiving member 8. Therefore, the pressing force to some extent can be absorbed by the deformation of the pressure receiving member 8 within the interior of the clearance D, and the pressure receiving member 8 does not press the breakable member 4 to apply stress thereto. Accordingly, in the case where about one atmospheric pressure is pressed in the using state of the normal charge and discharge as in the secondary battery, the stability of the breaking pressure can be maintained for a long period of time.

Further, in the above-described embodiment, since the pressure receiving member 8 has the pre-pressure portion for applying a predetermined pressure to the operating member 6 in advance, the pre-pressure is always applied to the operating member 6 by the pressure receiving member 8, and the broken part of the breakable member 4 does not again come in contact for conduction due to a reaction or the like after the breakable member 4 has been broken.

Further, in the above-described embodiment, the pressure receiving member 8 is thicker in its peripheral edge than the other portions, and the peripheral edge is fixed to the outer peripheral portion of the box 2, 3. Therefore, even if the pressure increases, the pressure receiving member 8 is pulled inward as the pressure increases to enhance the sealing properties between the pressure receiving member 8 and the box 2, 3.

Further, in the above-described embodiment, the thickness of the pressure receiving member 8 in contact with the operating member 6 is greater than that of the peripheral portion. Therefore, the portion of the pressure receiving member 8 for pushing the operating member 6 tends to be compressed to become thinner. In the case where the pressure receiving member 8 is formed of a soft material in order to reduce the elasticity, the permeability of gas increases to lower the sealing properties. However, the portion of the pressure receiving member 8 in contact with the operating member 6 is thicker than the peripheral portion thereof, and said portion is not much deformed even if said portion is displaced from its original position. The thickness of the portion which is mainly deformed remains unchanged, thus enabling the enhancement of the sealing properties without increasing the elasticity.

Further, in the above-described embodiment, there comprises the box 2, 3 formed of an insulating material having a part opened, the pressure receiving member 8 for closing the opening 3c of the box 2, 3 and being deformed by pressure, the breakable member 4 contained in the box 2, 3, having the conductive path 10, and when the pressing by the pressure receiving member 8 exceeds a predetermined value, breaking the conductive path 10, the pair of connecting members 5 having conductivity connected to the conductive path 10, and the pair of terminals 7 joined to the connecting members 5 within the box 2, 3 and being insert-molded relative to the box 2, 3, the box 2, 3 being provided with depressions 2f extending to the back of the terminals of the joining portion between the connecting members 5 and the terminals 7. Therefore, the use of the battery involving the abnormality in which the atmospheric pressure within the battery rises can be positively stopped. Further, a material having a good connecting property with the conductive path 10 can be selected for the connecting member 5. Further since the elasticity of the connecting member 5 can be set to be smaller than that of the terminal 7, the influence of the breakable member 4 on the breaking characteristic can be minimized. Furthermore, since the insert molding of the lead connecting portions 7a to the box 2, 3 while held from both sides thereof by the depressions 2f and the like can be accomplished, a thin film of the molding material is hard to be formed on the joining surface of the terminal 7 to improve the stability of the joining.

Further, in the above-described embodiment, the partitioning wall 2g is provided between the joining portion and the breakable member 4, and the adhesive 12 is filled on the side of the joining portion partitioned by the partitioning wall 2g. Therefore, the sealing properties are improved to prevent the adhesive 12 from flowing on the side of the breakable member 4 to facilitate the management of the amount of the adhesive 12, enhancing the connecting strength between the terminal 7 and the connecting member 5.

Figure 13:
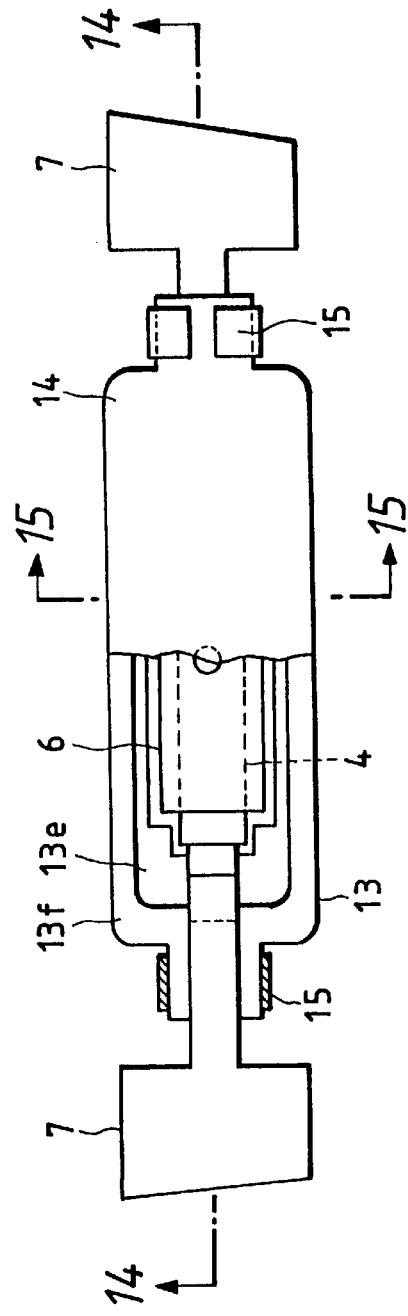
FIG. 13 is a partly cutaway plan view of a pressure actuated breaker according to a second embodiment of the present invention.
Figure 14:
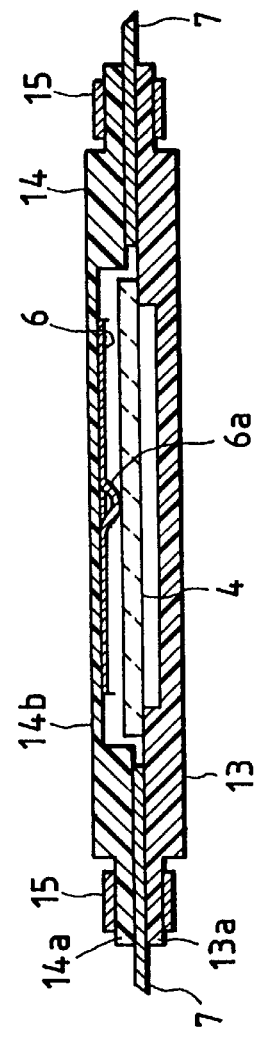
FIG. 14 is a sectional view taken on line 14—14 in FIG. 13.

Next, a second embodiment of the present invention will be described hereinafter with reference to FIGS. 13 to 16. FIG. 13 is a partly cutaway plan view of a pressure actuated breaker according to the second embodiment of the present invention. FIG. 14 is a sectional view taken on line 14—14 in FIG. 13.

Figure 15:
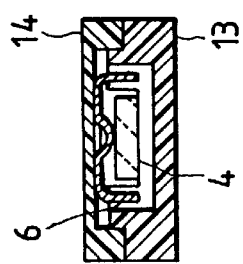
FIG. 15 is a sectional view taken on line 15—15 in FIG. 13.
Figure 16:
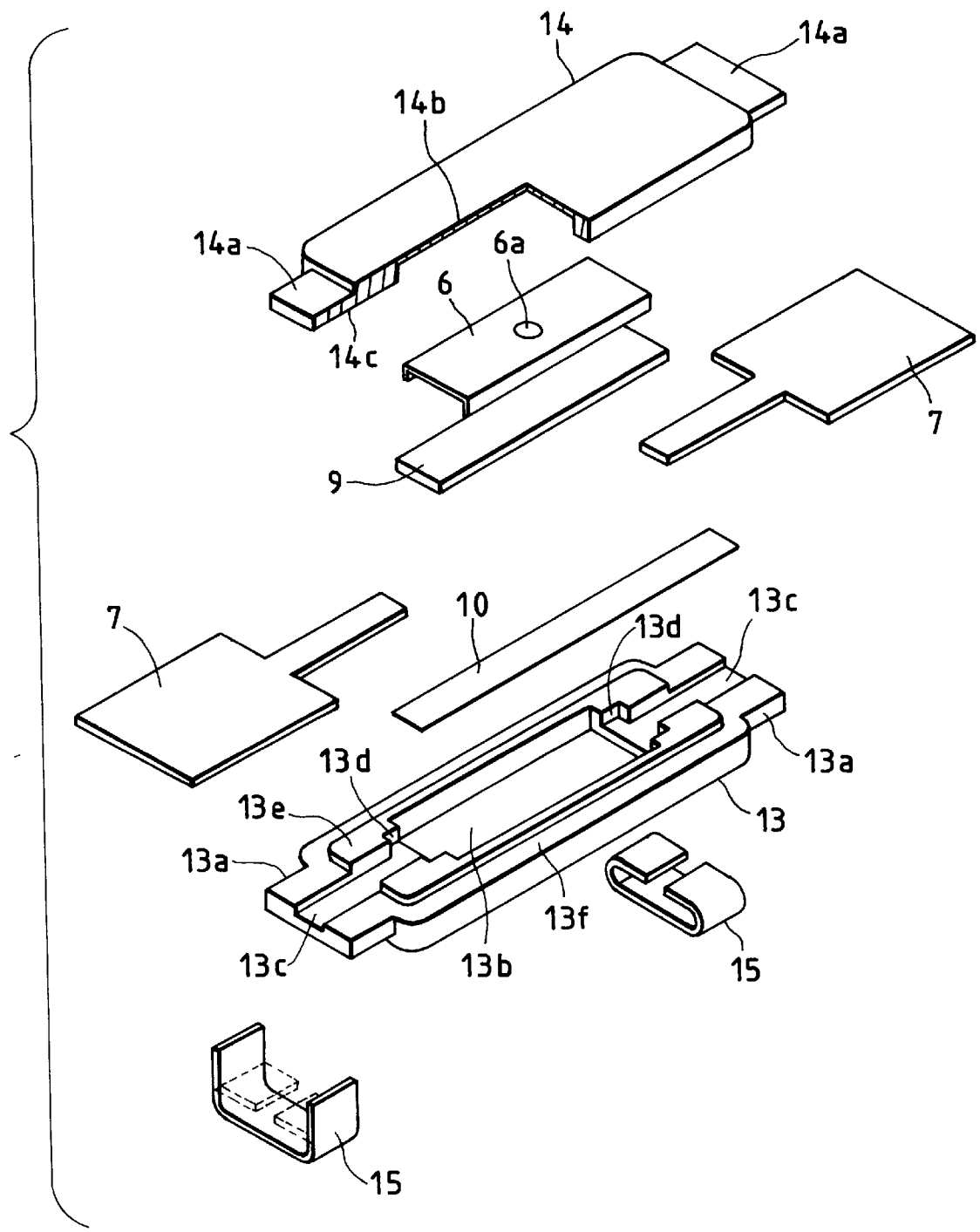
FIG. 16 is an exploded perspective view of the pressure actuated breaker in FIG. 13.

FIG. 15 is a sectional view taken on line 15—15 in FIG. 13. FIG. 16 is an exploded perspective view of the pressure actuated breaker in FIG. 13. Parts corresponding to those of FIGS. 1 to 12 are indicated by the same reference numerals.

The present embodiment is different from the aforementioned first embodiment in that the box is merely comprised of a lower case 13, a thermoplastic resin is used as a material for the lower case 13 and a lid 14 (pressure receiving member), and the joining portions between the lower case 13 and the lid 14 are thermally welded. That is, the lower case 13 is made of PP (polypropylene) as a thermoplastic resin, and ear portions 13a are projected from both ends lengthwise thereof, the lower case 13 having an elongated shape as a whole. The lower case 13 is formed in its center with a depression 13b upper surface of which is open. The both ear portions 13a is formed in the upper surface with terminal leading grooves 13c reaching the depression 13b. The connecting portions between the terminal leading grooves 13c and the depression 13b constitute element holding portions 13d. The lower case 13 is formed in the upper surface with convex portions 13e so as to surround the depression 13b, and flat surfaces from the peripheral edge of the convex portions 13e to the ear portions 13a constitute joining surfaces 13f. Both ends of the element 4 are held by the element holding portions 13d. In the case of the present embodiment, the element 4 is composed of an insulating member 9 formed of a material such as ceramic and a conductive portion 10 formed of a material such as copper foil adhered to the lower surface of the insulating member 9. However, this can be constructed similarly to the first embodiment. A pair of terminals 7 are connected to both ends of the conductive portion 10 by supersonic welding or the like, the terminals 7 extending externally passing through the terminal leading grooves 13c. Further, an actuator 6 formed of a material having a high rigidity such as phosphorous bronze is placed on the element 4, and the actuator 6 is provided with a projection 6a in contact with the central upper surface of the element 4.

On the other hand, the lid 14 is likewise made of the same PP (polypropylene) as that of the lower case 13, and ear portions 14a are projected from both ends lengthwise thereof, the lid 14 having the same contour as that of the lower case 13. The central portion of the lid 14 is formed to be thinner than the periphery thereof, and the thin portion forms a flexible portion 14b which is elastically deformed by pressure. The flexible portion 14b is in the form of a rectangle so as to oppose to the convex portions 13e of the lower case 13, and the lower surface of the thick-wall portion in the periphery of the flexible portion 14b constitutes a joining surface 14c. The lid 14 is placed over the lower case 13 through the element 4 and the actuator 6. The joining surfaces 13f and the joining surface 14c of the lower case 13 and the lid 14, respectively, are thermally welded by supersonic welding whereby the lower case 13 and the lid 14 are fixed. Stops 15 are caulked at the ear portions 13a and 14a of the lower case 13 and the lid 14, respectively, and the terminals 7 can be positively fixed by the stops 15.

In the thus constructed second embodiment, the box 13 and the pressure receiving member 14 both of which are formed of a thermoplastic resin are thermally welded to integrate both 13 and 14. Thus, the upper case 3 required in the first embodiment can be omitted, thus enabling the pressure actuated breaker thinner by that amount. Particularly, since both the box 13 and the pressure receiving member 14 are formed of the same kind of PP(polypropylene), congeniality during the thermal welding is excellent and the contactness can be improved.

Further, in the second embodiment, the terminals 7 are led out in the state held by the ear portions 13a, and 14a of the box 13 and the pressure receiving member 14, respectively, and the contactness between the box 13 and the pressure receiving member 14 somewhat lowers. However, since the ear portions 13a and 14a are caulked by the stops 15, the fixing strength of the box 13 and the pressure receiving member 14 is enhanced and the terminals 7 can be positively fixed. Moreover, since the ear portions 13a and 14a are formed to be thinner than other portions, the pressure actuated breaker does not become thick even if the stops 15 are used.

Figure 17:
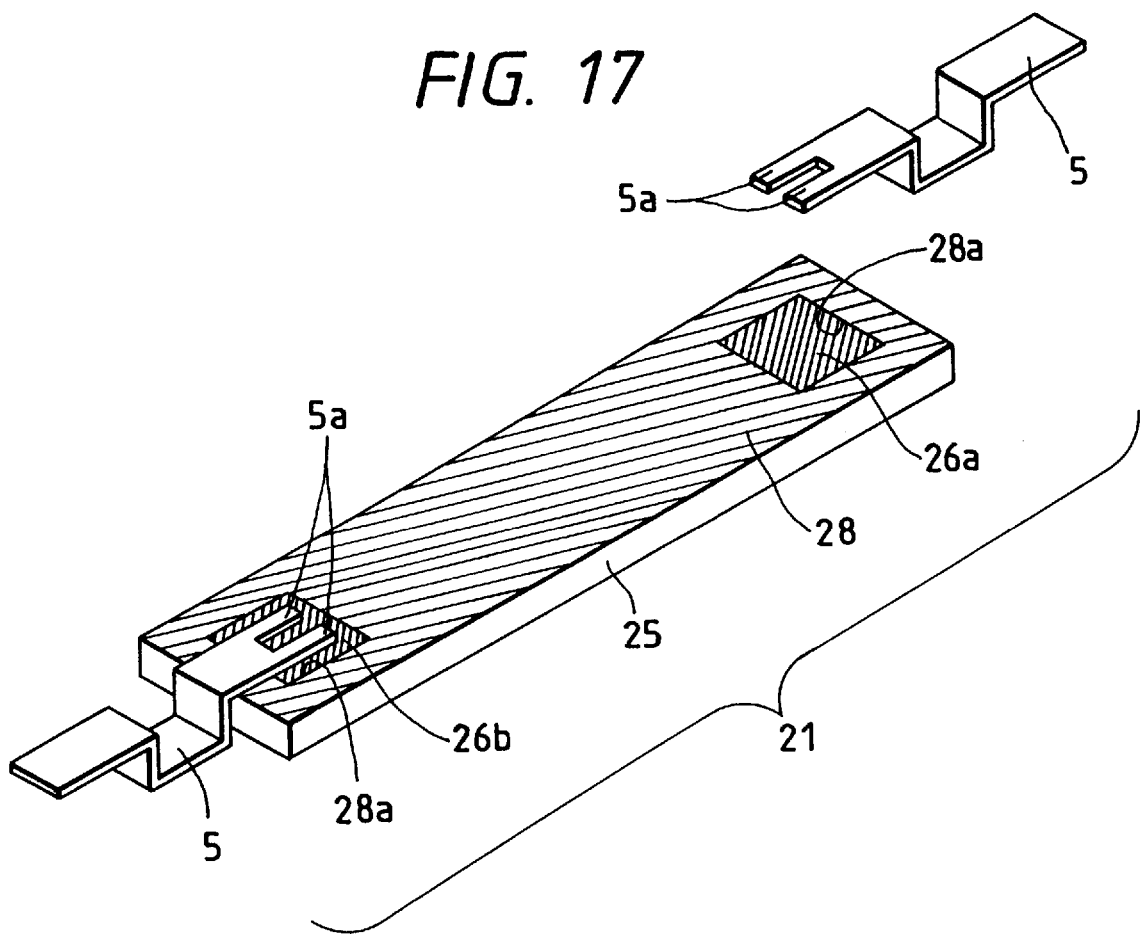
FIG. 17 is a view showing a part of a breakable member and a connecting terminal according to a third embodiment of the present invention.
Figure 18:
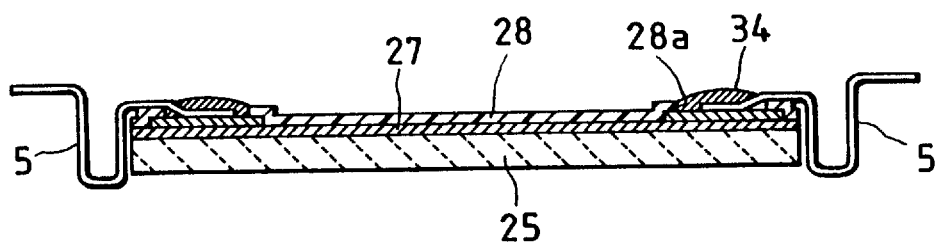
FIG. 18 is a view in which a part of the connecting terminal is soldered on the breakable member in FIG. 17.
Figure 19A:
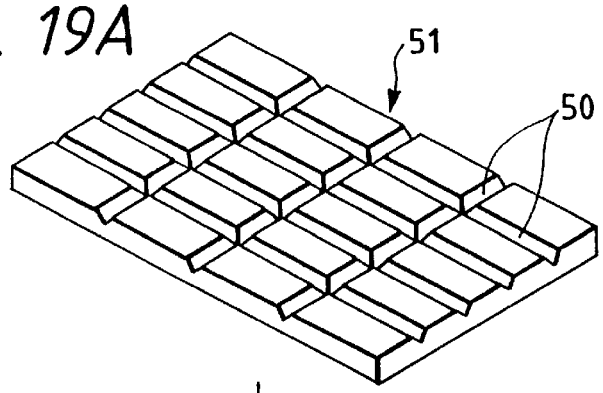
FIGS. 19A to 19E show the steps of production of the breakable member in FIG. 17.
Figure 19B:
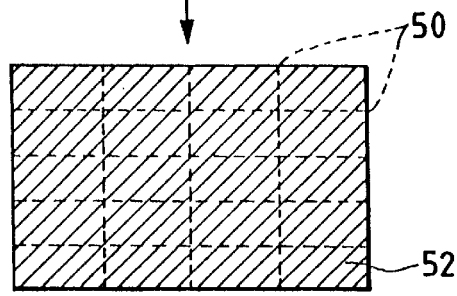
Figure 19C:
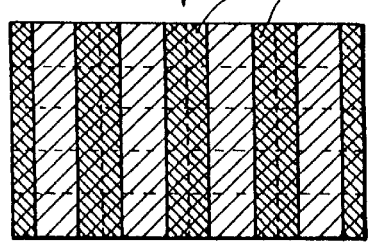
Figure 19D:
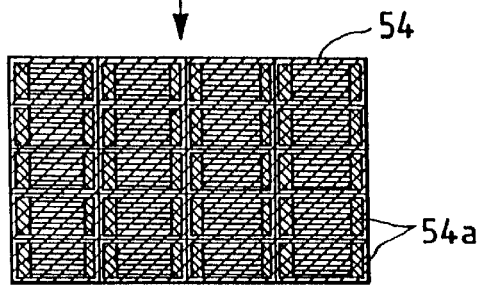
Figure 19E:
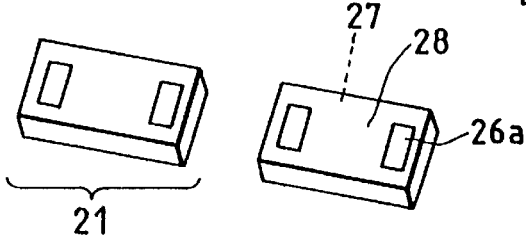
Figure 20:
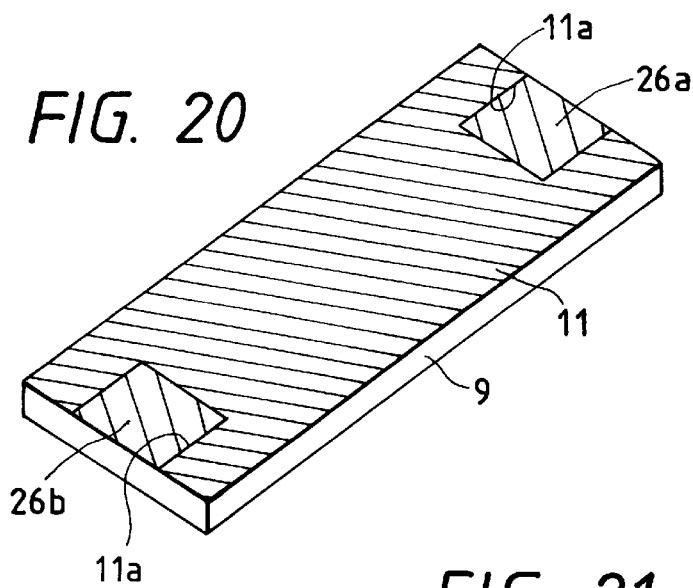
FIG. 20 is a view showing a modification of the opening of the pressure actuated breaker according to the third embodiment.

A third embodiment of the present invention will now be described with reference to FIGS. 17 to 20. FIG. 17 is a perspective view showing a breakable member and connecting terminals according to the third embodiment. FIG. 18 is a side view in which the connecting terminals are soldered on the breakable member in FIG. 17. FIG. 19 is a view showing the steps for producing the breakable member. FIG. 20 is a view showing a modification of an opening.

The present embodiment is different from the first and second embodiments in the constitution of the breakable member. In the present embodiment, the breakable member 21 (corresponding to the element 4 in the previous embodiments) comprises a ceramic substrate 25 as a substrate, a pair of electrodes 26a, 26b provided on both ends of the ceramic substrate 25, and a conductive path 27 provided between the electrodes 26a and 26b. A coating member 28 formed of an insulating material having openings 28a at portions corresponding to the electrodes 26a, 26a is provided on the conductive path 27. The elongation of the coating member 28 used is smaller than that of the conductive path 27.

Further, in the present embodiment, the pair of connecting terminals comprise two elements. That is, they comprise leads 5, 5 made of copper connected to the conductive path 27, and terminals 7 (FIGS. 1 to 6) connected to the leads 5, 5. The leads 5, 5 are formed from a sheet having split portions 5a, 5a at the extreme end thereof and are soldered by solder 34 to the electrodes 26a, 26b from the openings 28a of the coating member 28.

Since the construction of the other portions of the pressure actuated breaker is similar to that of the first and second embodiments, description thereof is omitted.

Next, the method for producing the breakable member 21 will be described with reference to FIGS. 19A to 19D. First, as shown in FIG. 19A, a green sheet formed in one surface with predetermined split grooves 50 is calcinated to obtain a ceramic substrate 51 (corresponding to the ceramic substrate 25). Next, as shown in FIG. 19B, a conductive path 52 (corresponding to the conductive path 27) is printed on the whole surface of the surface not formed with the split grooves 50 of the ceramic substrate 51, and after this, web-like electrodes 53 (corresponding to 26a, 26b) is printed and calcinated on the back over the split grooves 50 as shown in FIG. 19C. Thereafter, as shown in FIG. 19D, an insulating coating member 54 (corresponding to the coating member 28) is printed and calcinated on the whole surface of the ceramic substrate 51 leaving openings 54a (corresponding to the openings 28a) in parts of the electrodes 53. Finally, as shown in FIG. 19, the ceramic substrate 51 is split by the split grooves to obtain a plurality of individual breakable members 21.

The electrodes 26a, 26b include palladium in addition to silver and are designed not to produce a so-called silver consumption phenomenon in which when the leads 5, 5 are soldered to the electrodes 26a, 26b, as described previously, the silver is fused into the solder. Further, the conductive path 27 includes much silver as compared with the electrodes 26a, 26b to lower the resistance.

Furthermore, any of the conductive path 27, the electrodes 26a, 26b and the coating member 28 are calcinated and formed after printed with paste using the same material, glass components, as a binder, and thus the glass components are bonded together. Therefore, the ceramic substrate 25, the conductive path 27 and the coating member 28 are high in contactness and are formed integrally. The coating member 28 is formed to be harder than the conductive path 27.

In the production of the breakable member 21, the electrode 53 and the coating member 54 are integrally formed as described above, and the electrode 53 is sandwiched between the ceramic substrate 51 and the coating member 54. Therefore, in splitting the ceramic substrate 51 by the split grooves 50, the elongation phenomenon peculiar to the metal of silver components contained in the electrode 53 is suppressed by the hard ceramic substrate 51 and the coating member 54 on both surfaces, and the ceramic substrate 51 tends to be separated.

As shown in FIG. 17, the split portions 5a, 5a of the leads 5, 5 are placed on the openings 28a of the coating member 28, and the electrodes 26a, 26b and the leads 5, 5 are soldered by the solder 34. Accordingly, the solder 34 stays in the openings 28a, and the solder 34 is prevented from flowing out. Further, since the solder 34 tends to move in and between the split portions 5a, 5a of the leads 5, 5 due to the surface tension, the leads 5, 5 are positively fixed to the electrodes 26a, 26b. Since the opening 28a is formed with a depression, the height of the soldered portion can be suppressed. Since the method for producing the other parts of the pressure actuated breaker is similar to that of the first and second embodiments, description thereof is omitted (see FIG. 12).

While in the third embodiment of the present invention, the conductive path is formed by printing, it is to be noted that the conductive path can be formed by plating of metal. In this case, the plating surface is roughened and an epoxy adhesive is formed thereon to secure a close contact with the plating surface. The adhesive may be an insulative coating member. Further, in place of the ceramic substrate 25, PPS(polyphenylene sulfide) or a hard molding resin having a small elongation such as an epoxy resin may be used. The leads 5, 5 are not necessarily led out of the body of the pressure cut-off sensor but wiring members in pressure contact therewith may be provided within the battery. While the opening provided in the insulative coating member has the shape surrounded by four sides, it is to be noted that a shape may be employed in which one side at the end of the ceramic substrate is not present as shown in FIG. 20.

Figure 21:
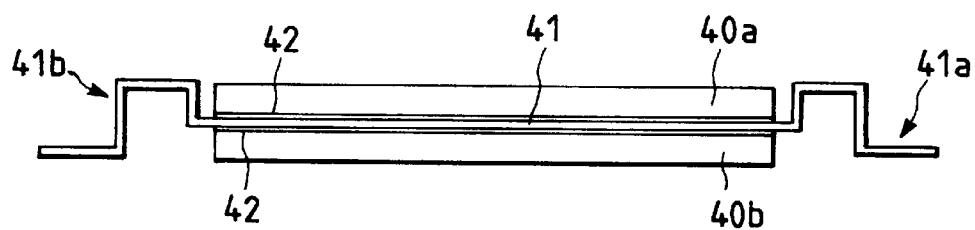
FIG. 21 is a sectional view of main parts of a pressure actuated breaker according to a fourth embodiment of the present invention.
Figure 22:
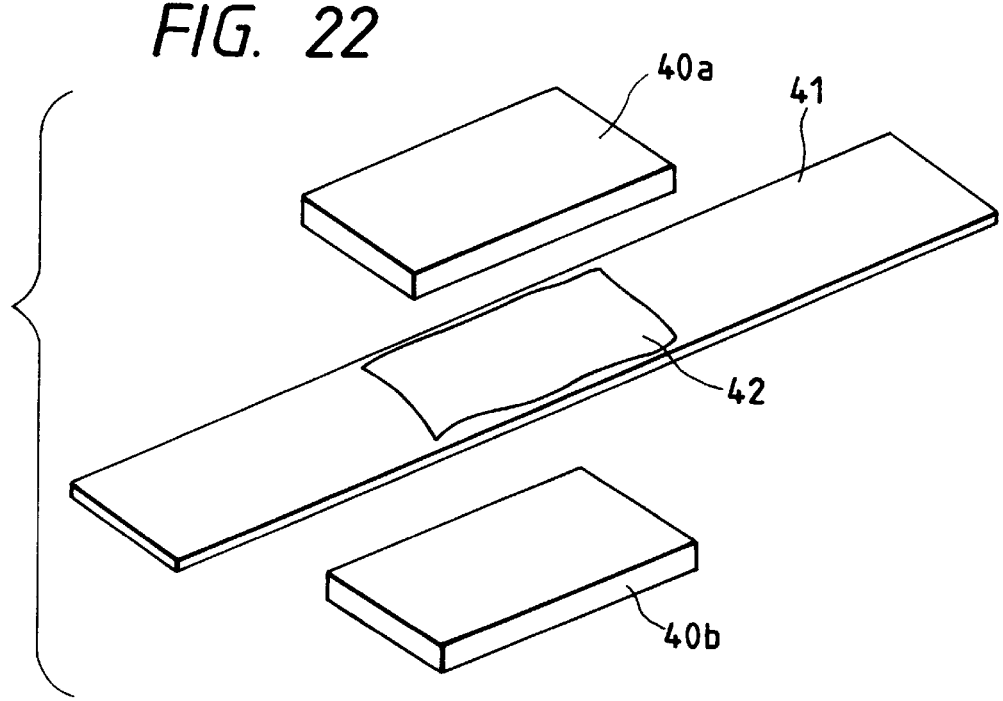
FIG. 22 is an exploded perspective view of main parts of the pressure actuated breaker in FIG. 21.
Figure 23:
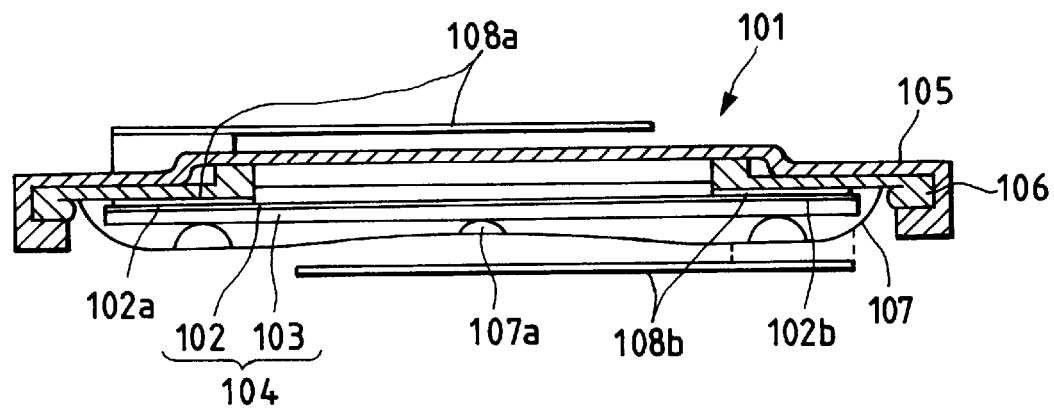
FIG. 23 is a view showing a conventional pressure protection device.

Next, a fourth embodiment of the present invention will be described with reference to FIGS. 21 and 22. FIG. 21 is a sectional view of main parts of a pressure actuated breaker according to the fourth embodiment of the present invention. FIG. 22 is an exploded perspective view of main parts of the pressure actuated breaker shown in FIG. 21. The fourth embodiment of the present invention is different from the third embodiment in that in place of the breakable member 21 and the leads 5, 5, ceramic substrates 40a, 40b with an aluminum foil 41 sandwiched therebetween are provided. The aluminum foil 41 has a thickness of approximately 2 mm, and a width which is substantially the same as that of the ceramic substrates 40a, 40b. Between the aluminum foil 41 and the ceramic substrates 40a, 40b are provided an adhesive 42 for integrating them. The aluminum foil 41 is provided at both ends thereof with extensions 41a, 41b extended from the ceramic substrates 40a, 40b. The extensions 41a, 41b are bent and connected to the external terminals by a method such as supersonic welding or the like similarly to the third embodiment. Also in this case, the elongation of the metal foil sandwiched between the ceramic substrates is suppressed and easily broken and the conductive path is formed of a metal foil, thus reducing the resistance. Further, since the number of connections of the terminals can be reduced, the reliability is improved, and no soldering operation and management resulting therefrom are necessary.

It is to be noted that in the fourth embodiment, in place of the ceramic substrates 40a, 40b, PPS(polyphenylene sulfide) or a hard molding resin having a small elongation such as an epoxy resin can be used to insert-mold the aluminum foil 41. Other metal foils other than the aluminum foil can be also used.

While the invention has been particularly described with reference to preferred embodiments thereof, it will be understood by those skilled in the art that the foregoing and other changes in form and details can be made therein without departing from the spirit and scope of the invention.

What is claimed is:

1. A pressure actuated breaker comprising:
   a box formed of an insulating material and defining an opening;
   a pressure receiving member disposed to cover the opening of said box, the pressure receiving member being formed from a flexible material such that the pressure receiving member is deformed inwardly into the box by external pressure;
   an operating member having a higher rigidity than said pressure receiving member and being located inside of the box adjacent the pressure receiving member such that the operating member is pressed away from the opening by said deformation of said pressure receiving member; and
   a breakable member contained in said box, said breakable member including a substrate and a conductive path formed on the substrate, said substrate being formed from a breakable material and being supported in said box such that when the breakable member is pressed by said operating member with a force exceeding a predetermined value, the substrate is cracked, thereby breaking said conductive path.

2. A pressure actuated breaker according to claim 1, wherein a clearance is provided between said pressure receiving member and said operating member.

3. A pressure actuated breaker according to claim 1, wherein said pressure receiving member is provided with a pre-pressure portion for applying a predetermined pre-load pressure to said operating member.

4. A pressure actuated breaker according to claim 1, wherein the pressure receiving member includes a central portion surrounded by a peripheral edge portion, and said peripheral edge portion of said pressure receiving member is made thicker than the central portion, said peripheral edge portion being secured to an outer peripheral portion of said box.

5. A pressure actuated breaker according to claim 1, wherein a thickness of a portion of said pressure receiving member in contact with said operating member is made thicker as compared with that of a peripheral portion thereof.

6. A pressure actuated breaker according to claim 1, wherein both said box and said pressure receiving member are formed of a thermoplastic resin, and a joining surface between said box and said pressure receiving member is thermally welded.

7. A pressure actuated breaker according to claim 6, wherein said box and said pressure receiving member are formed of the same kind of thermoplastic resin.

8. A pressure actuated breaker comprising:
   a box formed of an insulating material and defining an opening;
   a pressure receiving member disposed to cover the opening of said box, the pressure receiving member being formed from a flexible material such that the pressure receiving member is deformed inwardly into the box by external pressure;
   a breakable member contained in said box, said breakable member including a substrate and a conductive path formed on the substrate, said substrate being formed from a breakable material and being supported in said box such that when the breakable member is pressed by the pressure receiving member with a force exceeding a predetermined value, the substrate is cracked, thereby breaking said conductive path;
   a pair of connecting members having conductivity connected to said conductive path; and
   a pair of terminals joined to said connecting members within said box and being insert-molded to said box,
   wherein said box is provided with a depression extending to the back of terminals of the joining portion between said connecting members and said terminals.

9. A pressure actuated breaker according to claim 8, wherein a partitioning wall is provided between said joining portion and said breakable member, and an adhesive is filled on the side of said joining portion partitioned by said partitioning wall.

10. A pressure actuated breaker comprising:
    a box formed of an insulating material and defining an opening;
    a pressure receiving member for closing the opening of said box and being deformed by pressure;
    a breakable member contained in said box, said breakable member comprising a substrate having a conductive path formed on a surface thereof, said conductive path having an elongation modulus, the substrate being formed from a material having a smaller elongation modulus than that of said conductive path, and a coating member formed integrally on said conductive path and being formed from a material having a smaller elongation modulus than that of said conductive path, said substrate being supported in said box such that when the breakable member is pressed by the pressure receiving member with a force exceeding a predetermined value, the substrate is cracked, thereby breaking said conductive path; and
    a pair of connecting terminals in conduction with said conductive path and being extended outside of said box.

11. A pressure actuated breaker according to claim 10, further comprising an electrode provided at the end of said conductive path,
    said coating member being provided so as to have an opening on said electrode, and
    said connecting terminals being placed in said opening and connected to said electrode by soldering.

* * * * *